July 7, 1964   F. JAKOB ETAL   3,139,804
CAMERA WITH AUTOMATIC DIAPHRAGM
Filed April 26, 1961
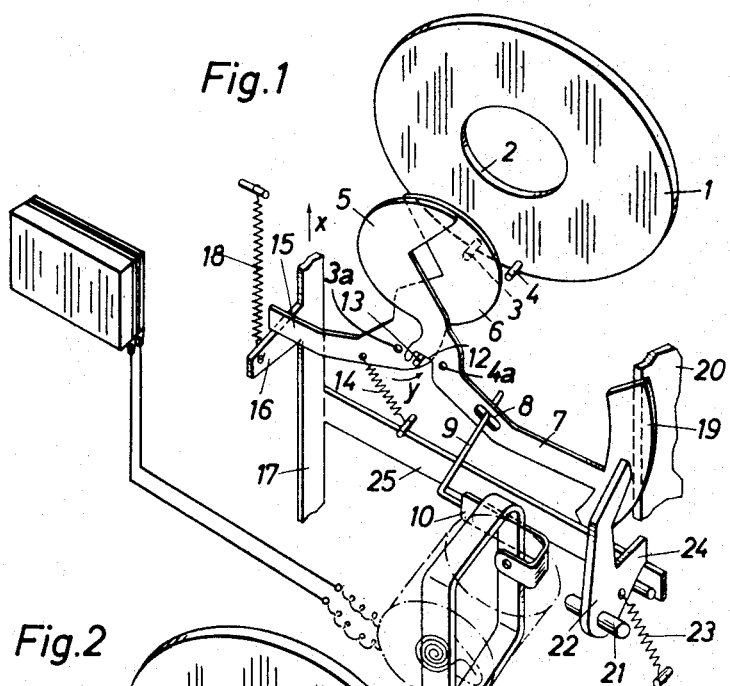
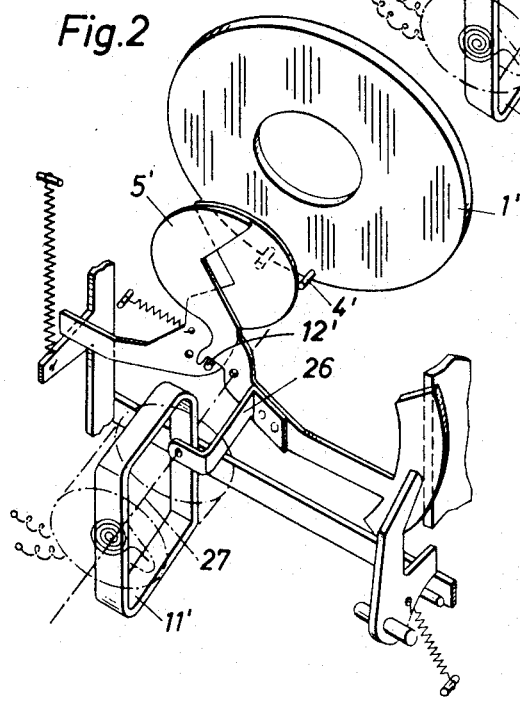
INVENTORS
FRANZ JAKOB
ROLAND KNORR
BY Michael S. Striker United States Patent Office 3,139,804
Patented July 7, 1964

3,139,804
CAMERA WITH AUTOMATIC DIAPHRAGM
Franz Jakob, Unterhaching, near Munich, and Roland Knorr, Munich, Germany, assignors to Agfa Aktiengesellschaft, Leverkusen, Bayerwerk, Germany
Filed Apr. 26, 1961, Ser. No. 105,731
Claims priority, application Germany May 3, 1960
14 Claims. (Cl. 95—10)

The present invention relates to cameras.

More particularly, the present invention relates to automatic diaphragms of cameras.

Where cameras are provided with automatic diaphragms it is conventional, for example, to provide a diaphragm which has only two diaphragm blades which are automatically actuated by the light-responsive structure of the camera. This conventional structure requires either a galvanometer of the light-responsive structure which is powerful enough to turn both of the blades of the diaphragm or in some cases it is conventional to provide separate galvanometers for each of the diaphragm blades so that where there are two diaphragm blades there would be two galvanometers. In either event there is a considerable disadvantage because of the requirement of a relatively large and powerful galvanometer where only one galvanometer is used or because there is a requirement of a relatively large number of galvanometers. While diaphragms are known which have but one diaphragm blade, such diaphragms are not very efficient since they result in an inability to use the full opening of the objective and they provide a one-sided vignetting.

One of the objects of the present invention is to avoid the above drawbacks by providing a structure where a diaphragm which includes a plurality of diaphragm blades nevertheless has the position of the diaphragm blades controlled by a light-responsive structure which includes but one relatively light galvanometer.

Another object of the present invention is to provide a diaphragm structure of the above type wherein the diaphragm operates in an optically perfect manner.

It is a further object of the present invention to provide a structure of the above type which is relatively inexpensive and which is also compact and simple.

An additional object of the present invention is to provide in an automatic diaphragm of the above type a structure wherein the movement of the diaphragm blades is balanced.

With the above objects in view the invention includes, in a camera, at least one diaphragm blade and a support means which supports this blade for movement between a pair of end positions. An urging means cooperates with the above diaphragm blade for urging and moving the same from one of these end positions toward the other of these end positions, and a manually operable release means cooperates with the diaphragm blade for holding it in opposition to the above spring means in the one end position from which it is moved by the spring means until the release means is actuated by the operator, so that the spring means will then move the diaphragm blade toward the other of its end positions. A first stop means is operatively connected to the blade to be moved along a predetermined path while the blade moves between its end positions. Second stop means and another diaphragm blade are operatively connected with a light-responsive means which moves the second stop means along the path of movement of the first stop means so as to locate the second stop means at a position along this path which is determined by the lighting conditions which moves also the other diaphragm blade in accordance with the lighting conditions. In this way, although the light-responsive means is in no way connected to the one diaphragm blade it will nevertheless control the position of this diaphragm blade since this blade will be able to be moved by the spring means only until the first stop means engages the second stop means, and thus the light-responsive means can be quite light since it is only required to move the other diaphragm blade and the second stop means while at the same time it is capable of controlling the position of the one diaphragm blade.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawings, in which:

FIG. 1 is a perspective exploded partly diagrammatic illustration of one embodiment of an automatic diaphragm assembly according to the present invention; and FIG. 2 is a perspective exploded partly diagrammatic illustration of another embodiment of an automatic diaphragm assembly according to the present invention.

Referring to FIG. 1 there is shown therein a stationary annular plate 1 which forms part of the objective of the camera and which is formed with a central opening 2 through which the light rays pass along the optical axis of the camera. The stationary plate 1 fixedly carries a pair of pivot pins 3 and 4 which respectively extend through openings 3a and 4a of a pair of diaphragm blades 6 and 5, respectively. In this way pins 3 and 4 together with the plate 1 form a support means which supports the diaphragm blades for movement between a pair of end positions. The diaphragm blade 5 includes an elongated arm 7 which is formed with a slot 8. A pin 9 extends in a direction parallel to the optical axis through the slot 8 and is fixed to a motion transmitting member 10 which is in turn fixed with the rotor 11 of the galvanometer of a well-known light-responsive means which measures the light which is available for making an exposure and which turns the rotor 11 to an angular position which is indicative of the lighting conditions, as is well-known.

Integral with the blade 5 is an edge portion 12 which forms a stop means. It will be seen that this stop means 12 is integrally formed with the arm 7 which is turned by the light-responsive means 11 so that the light-responsive means 11 and the stop means 12 form a unitary assembly and through the pin-and-slot connection 8, 9 the light-responsive means 11 will determine the position of the stop means 12 according to the lighting conditions. The diaphragm blade 6 fixedly carries a stop member or pin 13 which forms a second stop means. It will be noted that the stop means 12 is located at all times along the path of turning of the stop means 13, so that the light-responsive means 11 serves to position the stop means 12 at a location along the path of movement of the stop means 13 which is determined by the lighting conditions. A spring means or urging means 14 is operatively connected to the diaphragm blade 6 for urging and moving it from one end position toward its other end position, and the spring 14 urges the diaphragm blade 6 to turn about the pin 3 in the direction of the arrow y of FIG. 1 so that the spring 14 urges the stop means 13 into engagement with the stop means 12. The diaphragm blade 6 includes an integral extension 15 which extends over an arm 16 of an elongated bar 17 which is adapted to move vertically and which forms part of a manually operable structure for releasing the shutter of the camera. It will be seen that the spring 14 maintains the arm 15 in engagement with the arm 16. The elongated bar 17 is operatively connected to spring 18 which urges the bar 17 upwardly to its rest position, as indicated by the arrow x in FIG. 1. When the bar 17 is in its rest position it holds the diaphragm blade 6 in opposition to the spring means 14 in one of the end positions of the diaphragm blade 6, this end position being that where the diaphragm blade 6 provides an aperture of maximum size in the illustrated example, and thus it will be seen that the elements 16–18 form a manually operable release means for holding the diaphragm blade 6 in one of its end positions in opposition to the spring 14, the spring 18 of course being stronger than the spring 14. It will be noted that one end of the spring 14 is connected directly with the blade 6 while the other end is connected to a stationary pin which is carried by a stationary part of the camera. When the manually operable release means 16–18 is actuated by the operator the bar 17 will be moved downwardly, as viewed in FIG. 1, with the result that the blade 6 will be released to the spring means 14 which will now turn the blade 6 in the direction of the arrow y shown in FIG. 1, and this turning of the blade 6 will continue until the stop means 13 engages the stop means 12, so that the stop means 12 whose position is determined by the light-responsive means 11 will in fact determine the position of the blade 6 when an exposure is made although it will be seen that the light-responsive means 11 cooperates only with the stop means 12 to position the latter and does not position the diaphragm blade 6, so that in this way it is possible to make the light-responsive means 11 of a relatively small, weak construction.

A holding means is provided for releasably holding the stop means 12 in a position to be engaged by the stop means 13 just before an exposure is made, and this holding means includes a portion 19 of the arm 7 which is adapted to be gripped between stationary and movable members of the holding means. The stationary member of the holding means is formed by the stationary wall 20 and the movable member of the holding means is formed by the lever 22 which is supported for rotary movement by a stationary pin 21 of the camera. A spring 23 is connected at one end to the lever 22 and at its opposite end to a stationary pin of the camera so as to urge the upper end of the lever 22, as viewed in FIG. 1, toward the stationary holding member 20, and it will be seen that the portion 19 of the arm 7 is located in the gap defined between the movable and stationary holding members 20 and 22 so that when the movable member is moved by the spring 23 toward the stationary member 20 the portion 19 of the arm 7 will be gripped between the members 20 and 22 and thus the stop means 12 will be held by the holding means in a position to be engaged by the stop means 13 so as to determine the position of the diaphragm blade 6. The portion 19 of the arm 7 serves the additional function of forming a counterbalance for the blade 5.

The lever 22 which forms the movable holding member of the holding means has an extension 24 which extends over and engages in the rest position of the manually operable release means 16–18 an elongated arm 25 which is fixed to the bar 17 for movement therewith. In the rest position of the bar 17 the arm 25 holds through the projection 24 the lever 22 in a position where its upper free end is turned away from the stationary member 20 to provide a gap through which the portion 19 of the arm 7 can freely swing, the spring 18 being substantially stronger than the total of the forces of the springs 14 and 23. It will be seen that when the operator actuates the manually operable release means 16–18 not only will the blade 6 be released to the spring 14 but in addition the movable member 22 of the holding means will be released to the spring 23 so that simultaneously with the turning of the blade 6 by the spring 14 the spring 23 turns the lever 22 to cause the portion 19 of the arm 7 to be gripped between the holding members 20 and 22.

Thus, in the rest position of the parts the manually operable means 16–18 will hold the blade 6 in a position where the opening 2 is free to have light rays pass therethrough. Also, the means 16–18 through the arm 25 of the bar 17 holds the holding means 20, 22 in a rest position where it does not hold the stop means 12 against movement. Thus, at this time the light-responsive means 11 can locate the stop means 12 as well as the blade 5 at a position determined by the lighting conditions.

When an exposure is to be made the operator will, through an unillustrated manually-engageable portion, depress the bar 17 in opposition to the spring 18 so that the movable member of the holding means, namely the lever 22, will be turned by the spring 23 to clamp the portion 19 between the members 20 and 22, and thus the position of the blade 5 as well as the stop means 12 will be determined. The spring 14 turns the blade 6 until the stop means 13 engages the stop means 12. Thus, the position of the diaphragm is automatically determined. The continued downward movement of the arm 17 by the operator will result in a well-known way in release of the shutter. After the exposure is made the operator releases the bar 17 which is returned to its rest position by the spring 18, and this results in the arm 16 engaging the arm 15 to return the blade 6 in opposition to the spring 14 to its rest position and also in engagement of the arm 25 with the arm 24 so as to return the lever 22 to its rest position releasing the portion 19 for movement in the gap between the elements 20 and 22.

The embodiment of the invention which is illustrated in FIG. 2 differs from that of FIG. 1 only in that the blade 5', which corresponds to the blade 5, as well as the stop means 12', are directly fixed to the light-responsive means 11'. Thus, the light-responsive means has its rotor fixed to the arm 26 whose end is distant from the rotor is fixed directly to the arm which carries the blade 5' and the stop means 12', and thus the embodiment of FIG. 2 does not have a pin-and-slot connection between the rotor of the light-responsive means and the stop means whose position is controlled by the light-responsive means. Of course, in this case the axis of the rotor of the galvanometer coincides with the turning axis of the blade 5' which is determined by the position of the pin 4' which is carried by the stationary plate 1', and the common axis 27 of the rotor of the galvanometer as well as of the pin 4' is illustrated in FIG. 2. Except for this difference the structure of FIG. 2 is identical with and operates in the same way as that of FIG. 1.

Of course, the invention can be applied to diaphragms where more than one diaphragm blade will have its position determined by a stop means which has its position controlled by the light-responsive structure. Moreover, the stop means which determines the position of a blade such as the blade 6 need not be attached to another diaphragm blade and can instead be attached directly to the light-responsive structure so as to have its position determined thereby.

It will be understood that each of the elements described above, or two or more together, may also find a useful application in other types of diaphragms differing from the types described above.

While the invention has been illustrated and described as embodied in automatic diaphragms, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, at least one diaphragm blade; support means supporting said one blade for movement between a pair of end positions; urging means cooperating with said one blade for urging and moving the same from one of said end positions toward the other of said end positions; manually operable release means cooperating with said one blade for holding the same in opposition to said urging means in said one end position until said release means is actuated by the operator to release said one blade to said urging means which then moves said one blade from said one end position toward said other end position, said manually operable release means having a portion against which a portion of said one blade is continuously urged by said urging means so that the extent of movement of said one blade by said urging means is determined by the extent of movement of said manually operable release means; first stop means operatively connected to said one blade to be moved along a predetermined path while said blade moves from said one toward said other end position; second stop means; another diaphragm blade; light-responsive means operatively connected to the said other diaphragm blade for determining the position thereof in accordance with the lighting conditions and also operatively connected to said second stop means for moving the same along said path and for locating said second stop means at a position along said path determined by the lighting conditions, and holding means cooperating with said second stop means for holding said second stop means, when said manually operable release means is actuated by the operator, at a position along said path determined by said light-responsive means so that said urging means will move said one blade until said first stop means engages said second stop means, whereby the position of both of said blades is determined by said light-responsive means while the latter is required to move only said other diaphragm blade and said second stop means.

2. In a camera, in combination, at least two diaphragm blades; support means supporting one of said blades for movement between a pair of end positions; spring means cooperating with said one blade for urging and moving the same from said one end position toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means; light-responsive means operatively connected to the other of said diaphragm blades for determining the position thereof in accordance with the lighting conditions and also operatively connected to said second stop means for moving the same along said path and for locating said second stop means at a position along said path determined by the lighting conditions; and holding means cooperating with said second stop means for holding said second stop means, when said manually operable release means is actuated by the operator, at a position along said path determined by said light-responsive means, so that said spring means will move said one blade until said first stop means engages said second stop means, whereby the position of both of said blades is determined by said light-responsive means while the latter is required to move only said other diaphragm blade and said second stop means.

3. In a camera, in combination, at least two diaphragm blades; support means supporting one of said blades for movement between a pair of end positions; spring means cooperating with said one blade for urging and moving the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means; light-responsive means operatively connected to the other of said diaphragm blades for determining the positions thereof in accordance with the lighting conditions and also operatively connected to said second stop means for moving the same along said path and for locating said second stop means at a position along said path determined by the lighting conditions; and holding means cooperating with said second stop means for holding the same, when said manually operable release means is actuated by the operator, at a position along said path determined by said light-responsive means, so that said spring means will move said one blade until said first stop means engages said second stop means, whereby the position of both of said blades is determined by said light-responsive means while the latter is required to move only said other diaphragm blade and said second stop means, said holding means having a rest position spaced from said second stop means so that the latter is free to be moved by said light-responsive means when said holding means is in said rest position thereof and said holding means including a spring means which urges said holding means from said rest position thereof to a position cooperating with said second stop means for preventing movement thereof, said manually operable release means holding said holding means in opposition to said spring means thereof in said rest position until said manually operable means is actuated by the operator to release said blade so that both of said spring means operates simultaneously for respectively moving said one blade from said one end position toward said other end position thereof and for moving said holding means from said rest position thereof to a position cooperating with said second stop means for preventing movement thereof.

4. In a camera, in combination, at least two diaphragm blades; support means supporting one of said blades for turning movement between a pair of end positions; spring means cooperating with said one blade for urging and turning the same from one of said end positions toward the other of said end positions; manually operable release means cooperating with said one blade for holding the same in opposition to said spring means in said one end position until said release means is actuated by the operator to release said one blade to said spring means which then turns said one blade from said one end position toward said other end position, said manually operable release means having a portion against which a portion of said one blade is continuously urged by said spring means so that the extent of movement of said one blade by said spring means is determined by the extent of movement of said manually operable release means; a stop member fixedly carried by said one blade for movement therewith, said one blade when turned by said spring means moving said stop member along a predetermined path during movement of said one blade from said one toward said other end position; stop means; light-responsive means operatively connected to the other of said diaphragm blades for determining the position thereof in accordance with the lighting conditions and also operatively connected to said stop means for moving the same along said path and for locating said stop means at a position along said path determined by the lighting conditions, said stop means and said light-responsive means forming a unitary assembly; and holding means cooperating with said stop means for holding the same, when said manually operable release means is actuated by the operator, at a position along said path determined by said light-responsive means, so that said spring means will turn said one blade until said stop member engages said stop means, whereby the position of said one blade is determined by said light-responsive means while the latter is required only to move said other diaphragm blade and said stop means.

5. In a camera, in combination, at least two diaphragm blades; support means supporting one of said blades for movement between a pair of end positions; spring means cooperating with said one blade for urging and moving the same from one of said end positions where the diaphragm aperture has a maximum size toward the other of said end positions where the diaphragm aperture has a minimum size; manually operable release means cooperating with said one blade for holding the same in opposition to said spring means in said one end position until said release means is actuated by the operator to release said spring means which then moves said one blade from said one end position toward said other end position, said manually operable release means having a portion against which a portion of said one blade is continuously urged by said spring means, so that the extent of movement of said one blade by said spring means is determined by the extent of movement of said manually operable release means; first stop means operatively connected to said one blade to be moved along a predetermined path while said one blade moves from said one toward said other end position; second stop means; light-responsive means operatively connected to the other of said diaphragm blades for determining the position thereof in accordance with the lighting conditions and also operatively connected to said second stop means for moving the same along said path and for locating said second stop means at a position along said path determined by the lighting conditions; and holding means cooperating with said second stop means for holding the same, when said manually operable release means is actuated by the operator, at a position along said path determined by said light-responsive means, so that said spring means will move said one blade until said first stop means engages said second stop means, whereby the position of said one blade is determined by said light-responsive means while the latter is required to move only said other diaphragm blade and said second stop means.

6. In a camera as recited in claim 1, said manually operable release means forming part of a structure which releases the shutter of the camera after said first stop means engages said second stop means.

7. In a camera, in combination, at least two diaphragm blades; support means supporting one of said blades for movement between a pair of end positions; first spring means cooperating with said one blade for urging and moving the same from one of said end positions toward the other of said end positions; manually operable release means cooperating with said one blade for holding the same in opposition to said first spring means in said one end position until said release means is actuated by the operator to release said one blade to said first spring means which then moves said one blade from said one end position toward said other end position, said manually operable release means including a second spring means substantially stronger than said first spring means and said manually operable release means having a portion against which a portion of said one blade is continuously urged by said first spring means so that the extent of movement of said one blade by said first spring means is determined by the extent of movement of said manually operable release means in opposition to said second spring means; first stop means operatively connected to said one blade to be moved along a predetermined path while said blade moves from said one toward said other end position; second stop means; and light-responsive means operatively connected to the other of said diaphragm blades for determining the position thereof in accordance with the lighting conditions and also operatively connected to said second stop means for moving the same along said path and for locating said second stop means at a position along said path determined by the lighting conditions so that when said manually operable release means is actuated by the operator said one blade will be moved by said first spring means until said first stop means engages said second stop means whereby the position of said one blade is determined by said light-responsive means while the latter is required only to move said other diaphragm blade and said second stop means.

8. In a camera, in combination, at least two diaphragm blades; support means supporting one of said blades for movement between a pair of end positions; spring means cooperating with said one blade for urging and moving the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said blade moves from said one toward said other end position; second stop means; and light-responsive means operatively connected to the other of said diaphragm blades for determining the position thereof in accordance with the lighting conditions and also operatively connected to said second stop means for moving the same along said path and for locating said second stop means at a position along said path determined by the lighting conditions, whereby when said manually operable release means is actuated by the operator said spring means will move said one blade from said one end position toward said other end position until said first stop means engages said second stop means whereby said light-responsive means determines the position of said one blade while being required to move only said other diaphragm blade and said second stop means.

9. In a camera, in combination, at least two diaphragm blades; support means supporting one of said blades for movement between a pair of end positions; spring means cooperating with said one blade for urging the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means integral with the other of said blades; light-responsive means operatively connected to said other blade for moving the same and for moving said second stop means along said path for locating said second stop means at a position along said path determined by the lighting conditions and for locating said other blade at a position determined by the lighting conditions, whereby when said manually operable release means is actuated by the operator said spring means will move said one blade from said one end position toward said other end position until said first stop means engages said second stop means whereby said light-responsive means determines on the one hand the position of said other blade and on the other hand the position of said one blade while moving only said second stop means and said other blade.

10. In a camera, in combination, at least two diaphragm blades; support means supporting one of said blades for movement between a pair of end positions; spring means cooperating with said one blade for urging the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means integral with the other of said blades; light-responsive means operatively connected to said other blade for moving the same and for moving said second stop means along said path for locating said second stop means at a position along said path determined by the lighting conditions and for locating said other blade at a position determined by the lighting conditions, whereby when said manually operable release means is actuated by the operator said spring means will move said one blade from said one end position toward said other end position until said first stop means engages said second stop means whereby said light-responsive means determines on the one hand the position of said other blade and on the other hand the position of said one blade while moving only said second stop means and said other blade; and holding means cooperating with said other blade and said second stop means for holding the same stationary when said manually operable release means is actuated by the operator, said holding means including a stationary holding member and a movable holding member defining between themselves a gap in which a portion of said other blade is located.

11. In a camera, in combination, at least two diaphragm blades; support means supporting one of said blades for movement between a pair of end positions; spring means cooperating with said one blade for urging the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means integral with the other of said blades; light-responsive means operatively connected to said other blade for moving the same and for moving said second stop means along said path for locating said second stop means at a position along said path determined by the lighting conditions and for locating said other blade at a position determined by the lighting conditions, whereby when said manually operable release means is actuated by the operator said spring means will move said one blade from said one end position toward said other end position until said first stop means engages said second stop means whereby said light-responsive means determines on the one hand the position of said other blade and on the other hand the position of said one blade while moving only said second stop means and said other blade; and holding means cooperating with said other blade and said second stop means for holding the same stationary when said manually operable release means is actuated by the operator, said holding means including a stationary holding member and a movable holding member defining between themselves a gap in which a portion of said other blade is located, said portion of said other blade forming a counterbalance for said other blade.

12. In a camera, in combination, at least two diaphragm blades; support means supporting said blades respectively for turning movement about a pair of parallel axes between a pair of end positions; spring means cooperating with one of said blades for turning the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means integral with the other of said blades and turnable therewith along said path; and light-responsive means operatively connected to said other blade for moving the same and for locating said second stop means at a position along said path determined by the lighting conditions so that when said manually operable means is actuated by the operator said first stop means will move into engagement with said second stop means so that the light-responsive means determines the position of said one blade as well as said other blade.

13. In a camera, in combination, at least two diaphragm blades; support means supporting said blades respectively for turning movement about a pair of parallel axes between a pair of end positions; spring means cooperating with one of said blades for turning the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means integral with the other of said blades and turnable therewith along said path; and light-responsive means operatively connected to said other blade for moving the same and for locating said second stop means at a position along said path determined by the lighting conditions so that when said manually operable means is actuated by the operator said first stop means will move into engagement with said second stop means so that the light-responsive means determines the position of said one blade as well as said other blade, said light-responsive means including a rotor of an electrical instrument and said rotor being fixed to said other blade to turn the latter.

14. In a camera, in combination, at least two diaphragm blades; support means supporting said blades respectively for turning movement about a pair of parallel axes between a pair of end positions; spring means cooperating with one of said blades for turning the same from one of said end positions toward the other of said end positions; manually operable release means cooperating with said one blade for holding the same in opposition to said spring means in said one end position until said release means is actuated by the operator to release said one blade to said spring means which then moves said one blade from said one end position toward said other end position, said manually operable release means having a portion against which a portion of said one blade is continuously urged by said spring means so that the extent of movement of said one blade by said spring means is determined by the extent of movement of said manually operable release means; first stop means operatively connected to said one blade to be moved along a predetermined path while said one blade moves from said one toward said other end position; second stop means integral with the other of said blades and turnable therewith along said path; and light-responsive means operatively connected to said other blade for moving the same and for locating said second stop means at a position along said path determined by the lighting conditions so that when said manually operable means is actuated by the operator said first stop means will move into engagement with said second stop means so that the light-responsive means determines the position of said one blade as well as said other blade, said light-responsive means including a rotor of an electrical instrument; and pin-and-slot means connecting said rotor to said other blade for turning the latter in response to turning of said rotor.

References Cited in the file of this patent

UNITED STATES PATENTS

| | | |
|---|---|---|
| 2,421,499 | Guedon | June 3, 1947 |
| 2,969,004 | Gebele | Jan. 24, 1961 |

FOREIGN PATENTS

| | | |
|---|---|---|
| 1,211,089 | France | Oct. 5, 1959 |